US006762750B2

(12) United States Patent
Ullman

(10) Patent No.: US 6,762,750 B2
(45) Date of Patent: Jul. 13, 2004

(54) INPUT DEVICE FOR A COMPUTER AND A GRIP ARRANGEMENT FOR SUCH A DEVICE

(76) Inventor: Johan Ullman, Johannebergsgatan 30, S-412 55 Göteborg (SE)

( * ) Notice: Subject to any disclaimer, the term of this patent is extended or adjusted under 35 U.S.C. 154(b) by 214 days.

(21) Appl. No.: 10/024,032

(22) Filed: Dec. 21, 2001

(65) Prior Publication Data

US 2002/0080119 A1 Jun. 27, 2002

Related U.S. Application Data

(63) Continuation of application No. PCT/SE00/01313, filed on Jun. 20, 2000.

(30) Foreign Application Priority Data

Jun. 24, 1999 (SE) .............................................. 9901231

(51) Int. Cl.[7] .................................................. G09G 5/08

(52) U.S. Cl. ........................................ 345/163; 345/179

(58) Field of Search ......................... 345/179, 163–167, 345/156, 158, 161

(56) References Cited

U.S. PATENT DOCUMENTS 3,462,548 A 8/1969 Rinder
3,841,772 A * 10/1974 Snidar ........................ 403/224
4,780,707 A 10/1988 Selker
4,816,622 A 3/1989 Holloway
5,188,477 A * 2/1993 Idosako et al. ............. 403/133
5,210,405 A * 5/1993 Toyoda et al. .............. 250/221
5,369,262 A * 11/1994 Dvorkis et al. ............. 345/179
5,434,594 A * 7/1995 Martinelli et al. .......... 345/163
RE35,342 E * 10/1996 Louis et al. ................ 345/179
5,648,798 A * 7/1997 Hamling ..................... 345/163
5,805,143 A 9/1998 Myers
5,844,548 A * 12/1998 Chen et al. ................. 345/179
5,880,715 A 3/1999 Garrett
6,169,537 B1 * 1/2001 Taft ........................... 345/163
6,262,715 B1 * 7/2001 Sawyer ....................... 345/163

FOREIGN PATENT DOCUMENTS

EP 295368 12/1988
EP 501901 9/1992
EP 0501906 A1 9/1992
EP 867798 9/1998
JP 409073365 * 3/1997
WO 95/00897 1/1995
WO 98/06025 2/1998
WO 98/59316 12/1998

OTHER PUBLICATIONS

Anir MousePRO; PROversion—Serial, PS/2 or Combo; Feb. 12, 1998—www.animax.no/anirmousepro.html.

Henrik Jacobsson; Anir ger dig total fjärrkontroll; Computer Sweden, CS No. 10, Jul. 1997—http://domino.idg.se/cs/artikel.nsf/674b.

Patent Abstract of Japan, abstract of 9–062440 A (Kopecku Denshi KK) Mar. 7, 1997 (Jul. 3, 1997).

* cited by examiner

*Primary Examiner*—Regina Liang
(74) *Attorney, Agent, or Firm*—Burns, Doane, Swecker & Mathis, L.L.P.

(57) ABSTRACT

Input device for a computer comprising a support element (2) arranged for resting against a support pad (3), device for detecting the movement (4) of the support element in relation to the support pad, a communication device (5) arranged for wireless transmittal of information about the movement of the support element (2) in relation to said support pad (3) to a receiving unit.

25 Claims, 2 Drawing Sheets

9
7
23
2
6

7
9
24

6
2

INPUT DEVICE FOR A COMPUTER AND A GRIP ARRANGEMENT FOR SUCH A DEVICE

This application is a continuation of International Application No. PCT/SE00/01313 filed on Jun. 20, 2000, which International Application was published by the International Bureau in English on Jan. 4, 2001, and which claims priority from Sweden Application No. 9901231-2 filed in Sweden on Jun. 24, 1999.

TECHNICAL FIELD

The present invention relates to an input device. Usually, such input devices are named "computer mouse". Particularly, it is referred to an input device for a computer where the input device is designed to be controlled by groups of fine motor muscles. The invention also relates to a grip arrangement.

BACKGROUND OF THE INVENTION

Usually, a traditional input device or computer mouse is formed by a device for detecting movements, which device is enclosed in a shell. Generally, a such device for detecting movements comprises a ball enclosed within the shell where the movement of the input device in relation to a support pad is registered through that the movements of said ball in relation to the support pad are decoded. In other known input devices optical devices for detecting movements are used which have the disadvantage of solely being able to detect movement in relation to support pads specially designed for the movement detection device.

According to a second known technical solution, the input device comprises a ball which is facing the user and designed to be directly controlled by the user through that the ball is rotated by the user's fingers.

A problem with the above mentioned input devices is that the user is forced to perform static work with the muscles in that the forearm is pronated to an end position. Pronation means the arm's rotation of the forearm with the thumb side in inward position and the palm in outward position. This is done by rotating the bone of the forearm around its longitudinal axis. Except for the pronation, known technics causes unnecessary static ulnar deviation and frequently also extension in the wrist itself.

Further, by for instance EP 501 906, it is known an input device in the form of a so called joystick, where the movement of a grip arrangement is decoded for generating a control signal to a computer. When using a joystick the grip arrangement is rotated around a pivot point which is situated at or in connection to the mounting of the grip arrangement into the housing of the input device. This means that manoeuvring of the grip arrangement during some movements will be controlled with the gross motor muscles of the forearm, instead of the fine motor muscles of the fingers.

Furthermore, the movement of the grip arrangement in a joystick is decoded relative the input device itself. This means that the input device must be attached to a support in a torsionally rigid way, alternatively be supported by a user's both hands to operate satisfactorily.

To achieve input devices which allow handling by fine motor muscles, there have been proposed input devices in the form of a pen, which movements are decoded in relation to a drawing table. A disadvantage with this solution is that a special drawing table is needed and that the drawing table exhibits fixed positions. Thus, it is not the relative movement of the pen in relation to the drawing table that is decoded, but the position of the pen on the drawing table.

Moreover, it is known an input device in the form of a pen which supports a ball in the point of the pen and where the movement of the ball in relation to the pen is decoded. This pen presents a number of disadvantages. Partly, the pen must be held in a fixed angle to get the ball rolling, and partly there is no given orientation of the pen which means that divergence between the decoded movement and the performed movement can easily occur. In the example of rotating the pen 90°, a vertical movement of the pen can be apprehended by the computer as a horizontal movement. Furthermore, there is no simple form conformity between movements of the pen and decoded movement. In the example of transporting the pen along a support pad with a conical pendulum movement, the movement will be decoded as a straight line. The reason for this is that the angle of the pen is continuously changed during the pendulum whereby the movement of the ball in relation to the pen is constant. For instance this means that if a C is input with a conical pendulum, which is very common when a person writes and uses the fingers' fine motor muscles, this C will be interpreted as an I by the computer.

To be able to use this pen correctly, the shaft must be held in a constant angle, which means that the pen will be controlled with the gross motor muscles of the forearm, instead of the fine motor muscles of the hand.

SUMMARY OF THE INVENTION

One object of the invention is to provide an input device for a computer where the risk of repetitive strain injuries is reduced and where an increased input precision is allowed. A second object of the invention is to provide an input device where the orientation of the input device can easily be visually determined by a user. A third object of the invention is to provide a simple representation between a performed movement observed by the user and movement decoded by the means for detecting movements.

By adding a protrusion comprising a torsionally rigid, flexible joint to a support element in the input device, where said support element is designed to be controlled of a user via said torsionally rigid, flexible joint, it is made possible to handle the input device with the fine motor muscles in the user's hands. Furthermore, the decoded movement corresponds to the movement that the support element performs in relation to the support pad, since the torsionally rigid, flexible joint compensates for angle adjustments between the protrusion and the element.

DESCRIPTION OF DRAWINGS

In the following the invention will be closely described with reference to enclosed figures, in which.

PREFERRED EMBODIMENTS

Figure 1:
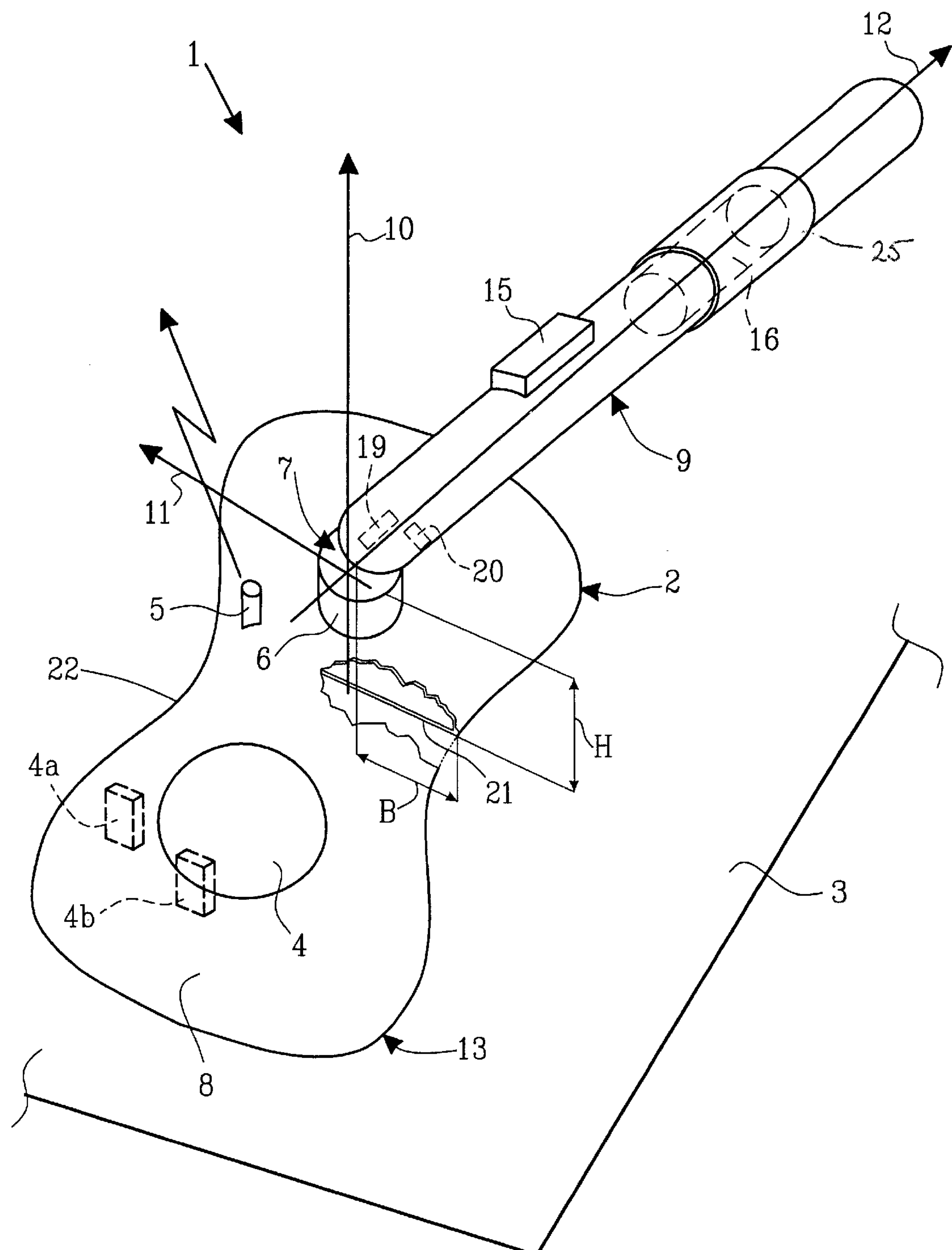
FIG. 1 shows a first embodiment of the invention where a grip arrangement is fixedly mounted to the support element.

FIG. 1 shows an input device generally denoted 1. The input device comprises a support element 2 which is arranged for resting against a support pad 3, for instance a mouse pad. In the support element 2 there are provided means 4 for detecting the movement of the support element 2 in relation to the support pad. For example, this means are formed by a ball provided in the input device in a known way. The support element 2 exhibits a lead-through in its underside, through which a portion of the ball will be exposed, whereby the ball will start rotating when the support element is moved over the surface of the support pad. This rotation is measured by detectors 4*a*, 4*b* whereby the movement can be detected. This type of input device is well known by a person skilled in the art and will not be more closely described. In an alternative embodiment of the invention, said detection means 4 are formed by an optical transmitter cooperating with the support pad, whereby the movement of the support element in relation can be measured. Even this type of input device is well known and it will therefore not be more closely described.

Further, the input device comprises communication means 5 which are arranged to wirelessly transmit information from detectors 4*a*, 4*b*, about the movement of the support element in relation to the support pad, to a computer communicating with the input device. The communication means comprises a transmitter. Communication means of this type are well known to a person skilled in the art and will not be further described. By designing wireless communication means, the input device can be moved freely without the limitations and disturbances that a wire connector would constitute.

Furthermore, said support element 2 is formed with a protrusion 6 comprising a torsionally rigid, flexible joint 7. The protrusion 6 is mounted onto a cover 8 comprising the electronics and mechanics of the support element 2. The protrusion 6 is mounted on the upper side of the cover 8. A pen formed grip arrangement 9 is mounted to the protrusion 8. When using the input device the user grips the pen formed grip arrangement 9 and controls the movement of the support element over the support pad. Advantageously, the pen formed grip arrangement is designed with such a length that contact is allowed at the same time between the middle and end phalanxes of the forefinger. The torsionally rigid, flexible joint 7 is arranged to admit rotation of the pen formed grip arrangement 9 around each orthogonal rotation axis 10, 11 to the longitudinal extension of the flexible joint but prevents rotation around the longitudinal extension 12 of the flexible joint relative the support element. To achieve this possibility, the flexible joint can be designed as a universal joint or a flexible but torsionally rigid bellows.

In a preferred embodiment of the invention, said torsionally rigid, flexible joint 7 exhibits a torsion resistance along each said orthogonal rotation axis which is enough to support the pen formed grip arrangement in upright position when the user is not exerting the pen formed arrangement. This means that the grip arrangement will be positioned in an upright or at least substantially upright position allowing an easy access to the grip arrangement. In an additional preferred embodiment of the invention, said torsionally rigid, flexible joint is resiliently designed whereby the pen formed grip arrangement 9 automatically can be brought to an upright position.

To admit the grip arrangement 7 and the support element 2 to maintain their correct position, said support element 2 and pen formed grip arrangement 7 are designed with such geometries and centres of gravity that the pen formed grip arrangement is not able to tip in any permitted position. This is achieved through that the support element 2 is given such a weight and centre of gravity that the pen formed grip arrangement 9 is not able to tip the support element 2 when the pen formed grip arrangement 9 is inclined 90° against the support pad.

Moreover, according to a preferred embodiment, the support element is designed to allow the torsionally rigid, flexible joint to be arranged at a small distance from the support pad. To admit the pen formed grip arrangement to be handled with preserved rest for the hand on the support pad, the torsionally rigid, flexible joint shall be placed at a height H, preferably between 0.5–4 cm, from the bottom surface 21 of the support element, which is shown by a through section in the upper portion of the cover. In an additional preferred embodiment this distance is between 1–2.5 cm. In an further preferred embodiment of the invention, the torsionally rigid, flexible joint is arranged in such a distance B from the edge 13 of the cover of the support element, so that it is possible to grip close to the wrist whereby control with good precision is provided to the user.

To fulfil the requirements for good access to the connection of the grip arrangement to the torsionally rigid, flexible joint to admit precision work and good balance for the support element to see to it that it is not too easy to tip unintentionally, the support element according to a preferred embodiment is designed with a cover 8 having a waist in connection to the torsionally rigid, flexible joint 7. This permits low placement of the flexible joint and a small distance between the flexible joint 7 and the outer edge. In a further preferred embodiment, the support element is symmetrically designed with a symmetry line formed along the narrowest extension of the support element 2. In an embodiment, the cover of the support element has the form of a half peanut providing a flat bottom surface and an upper side presenting two half spherical bodies joined via a waist. This form provides good access and good balance.

Moreover, FIG. 1 shows an embodiment of the invention in which the pen formed grip arrangement 9 or the protrusion 7 alternatively communicate with switches 19, 20 whereby these switch can be activated via axial and or radial effect of force via the pen formed grip arrangement 9. The switches are designed in a way known by a person skilled in the art and registers pressure, traction or torsion forces to activate a chosen function. In an embodiment of the invention these switches are placed in the pen formed grip arrangement, whereby a pressure along the longitudinal axis of the grip arrangement and is registered by a first switch 13 and a compressive force directed in the radial direction of the grip arrangement is registered by a switch 14. In this way it is possible to integrate push button functions in the grip arrangement whereby usually existing right and left mouse buttons can be replaced by radial and axial effect on the grip arrangement. In this way the input device can be used without needing to unnecessarily release the grip around the pen formed grip arrangement. It is also possible to mount the switches 19, 20 in the support element. In an embodiment of the invention the button pressing in the pen is formed pneumatically. This can be achieved through that the pen is provided with a cavity which is compressed whereby a pneumatic sensor registers the pressure or that the cavity is arranged in the support element and that the movement of the pen is registered via a pneumatic sensor in the support element. The switches are not substantial to the function of the torsionally rigid flexible joint, but form components in a preferred embodiment.

In further preferred embodiments a push button 15 can be mounted on the pen formed grip arrangement 9 for access and operation by means of a user's forefinger or thumb.

In an embodiment of the invention the pen formed grip arrangement is equipped with a voltage source 16 for supply to said means for detection of the movement of the support element in relation to the support pad and to said communication means comprised in the input device. The voltage source can be formed by an exchangeable battery or be chargeable alternatively. In the case of an exchangeable voltage source, it is preferably accessible via an aperture 25. If the voltage source is chargeable, the voltage source preferably presents connectors accessible from the outer of the grip arrangement.

In an embodiment of the invention the input device can comprise a bar code reader.

In further preferred embodiments the input device is provided with an energy saving function in two levels where parts of the electronics, except for the above mentioned communication means 5, are shut off after a first, short period of inactivity, for example about 1 second, and said communication means 5 are shut off after a second, longer period of inactivity, for example 15 minutes. The input device is woken from said energy saving positions via a mechanical movement sensor.

Figures 2, 3, 4:
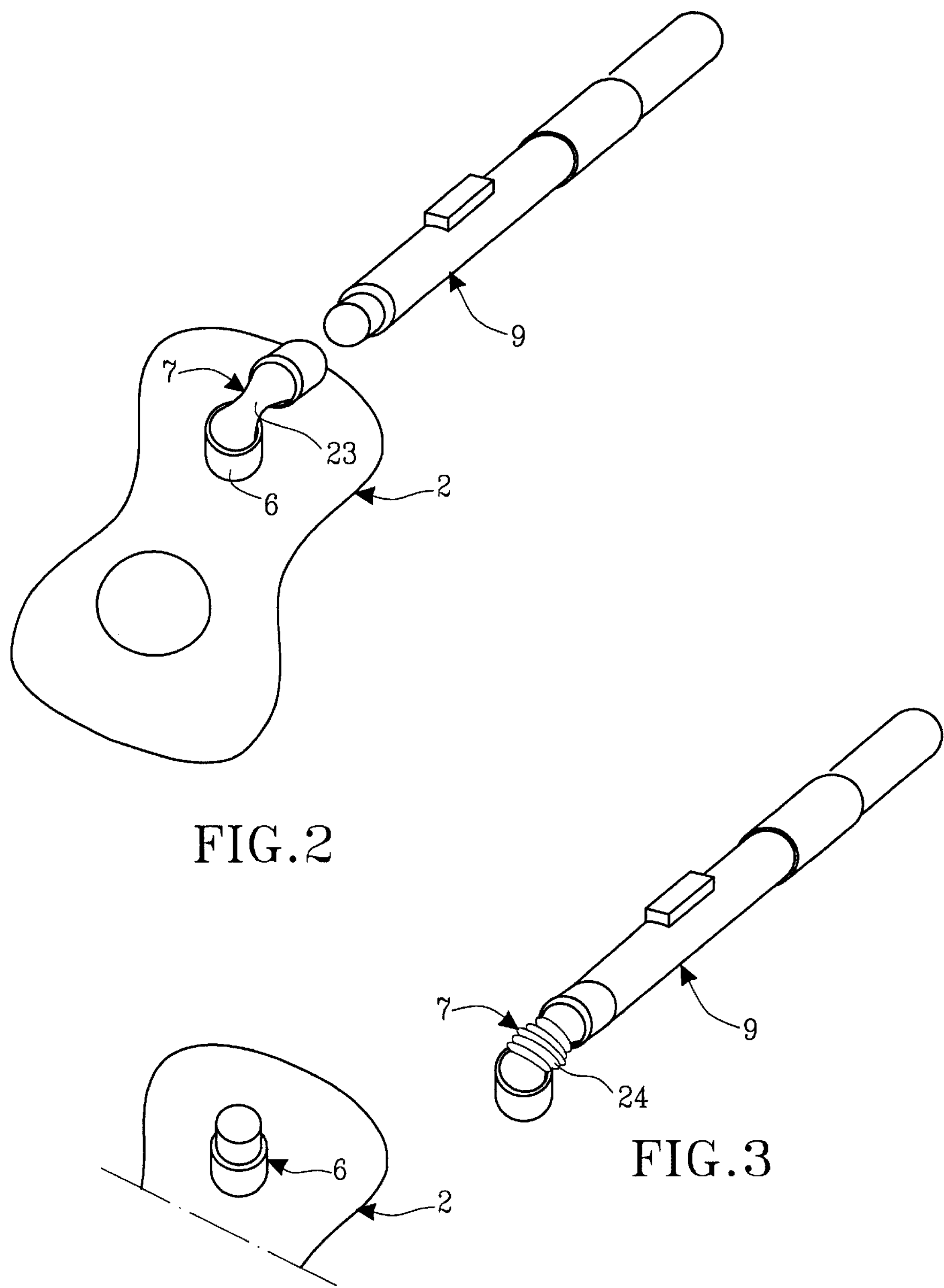
FIG. 2 shows a second embodiment of the invention where the grip arrangement is detachably mounted to the support element and where the support element supports a torsionally rigid, flexible joint.
FIG. 3 shows a third embodiment of the invention where the grip arrangement is detachably mounted to the support element and where the grip arrangement supports a torsionally rigid, flexible joint.
FIG. 4 shows the support element designed with a connection device for a grip arrangement which supports a torsionally rigid, flexible joint.

In FIGS. 2, 3 and 4 alternative embodiments of the invention are shown where the grip arrangement 9 can be released from the protrusion 7. In the embodiment shown in FIG. 2, the torsionally rigid, flexible joint is attached to the support element 2 whereby the embodiment shown in FIG. 3 has a flexible joint that is fixedly attached to the grip arrangement 9. In each case there is a docking unit, partly on the support element 2, partly on the grip arrangement 9. In case the grip arrangement is provided with a switch and or a voltage source there are connectors arranged in the docking unit. Preferably, the docking unit is designed with so called bayonet for simple connection and release. FIG. 4 shows the support element with a protrusion 6 for mounting of the torsionally rigid, flexible joint 7. In FIG. 2 the torsionally rigid, flexible joint is formed by a rubber coupling 23 which presents a waist which makes it easier to bend. In FIG. 3, the torsionally rigid, flexible joint is formed by a bellows 24. Naturally, the bellows and the rubber coupling can be combined to a torsionally rigid, flexible joint. The rubber coupling can also be replaced by a universal joint which is used together with a device for maintaining the position, for instance a bellows or a rubber coupling as mentioned above.

The invention is not limited to the above described embodiments but can be varied within the scope of the following claims. For example, the above described preferred embodiments can be combined freely.

What is claimed is:

1. Input device for a computer comprising a support element arranged for resting against a support pad, means for detecting the movement of the support element in relation to the support pad, communication means arranged for transmittal of information about the movement of the support element in relation to said support pad to a receiving unit, wherein, that said support element is formed with a protrusion comprising a torsionally rigid, flexible joint which is arranged to allow rotation, around each orthogonal rotation axis to the longitudinal extension of the flexible joint, during detection of the movement of the support element in relation to the support pad, but prevents rotation, around the longitudinal extension of the flexible joint, of a pen formed grip arrangement attached to said protrusion, whereby said support element is designed to be controlled by a user via said torsionally rigid, flexible joint.

2. Input device according to claim 1, wherein said torsionally rigid, flexible joint exhibits a torsion resistance along each said orthogonal rotation axis which is enough to support the pen formed grip arrangement in an upright position when a user is not exerting the pen formed grip arrangement.

3. Input device according to claim 1, wherein said torsionally rigid, flexible joint is resiliently formed.

4. Input device according to claim 1, wherein said protrusion is formed with a device for receiving a pen formed grip arrangement, whereby said support element is designed to be controlled by a user of the grip arrangement via said torsionally rigid, flexible joint.

5. Input device according to claim 4, wherein said device for receiving the pen formed grip arrangement is provided with connectors for connection to a voltage source mounted in said pen formed grip arrangement.

6. Input device according to claim 1, wherein said protrusion is connected to a pen formed grip arrangement, whereby said support element is designed to be controlled by a user of the grip arrangement via the torsionally rigid, flexible joint.

7. Input device according to claim 6, wherein said pen formed grip arrangement comprises a voltage source for said communication means and/or detection means.

8. Input device according to claim 1, wherein said support element and pen formed grip arrangement are designed with such geometries and centres of gravity that the pen formed grip arrangement is not able to tip the support element in any permitted position of rotation.

9. Input device according to claim 1, wherein the input device comprises connectors arranged to be activated through axial displacement of said protrusion.

10. Input device according to claim 1, wherein the input device comprises connectors arranged to be activated through axial displacement of said pen formed grip arrangement.

11. Input device according to claim 1, wherein the input device comprises connectors arranged to be activated through radial displacement of said protrusion.

12. Input device according to claim 1, wherein the input device comprises connectors arranged to be activated through radial displacement of said pen formed grip arrangement.

13. Input device according to claim 1, wherein said pen formed grip arrangement supports at least one key arranged for activation of a user's forefinger.

14. Input device according to claim 1, wherein the input device is provided with an energy saving function in two levels where parts of the electronics, except communication means 5 existing in the input device, are shut off after a first, short period of inactivity and said communication means 5 are shut off after a second, longer period of inactivity.

15. Input device according to claim 1, wherein the input device comprises a bar code reader.

16. Grip arrangement for an input device for a computer comprising a support element arranged for resting against a support pad, means for detecting the movement of the support element in relation to the support pad, communication means arranged for transmittal of information about the movement of the support element in relation to said support pad to a receiving unit, wherein said grip arrangement comprises a torsionally rigid, flexible joint provided to be connected to said input device, whereby said support element is designed to be controlled by a user via said torsionally rigid, flexible joint which is arranged to allow rotation of the grip arrangement around each orthogonal rotation axis to the longitudinal extension of the flexible joint during detection of the movement of the support element in relation to the support pad but prevents rotation around the longitudinal extension of the flexible joint.

17. Grip arrangement according to claim 16, wherein said pen formed grip arrangement comprises a voltage source for communication means and/or detection means existing in the support element.

18. Grip arrangement according to claim 16, wherein said torsionally rigid flexible joint exhibits a torsion resistance along each said orthogonal rotation axis which is enough to support the pen formed grip arrangement in upright position when a user is not exerting the pen formed grip arrangement.

19. Grip arrangement according to claim 16, wherein said torsionally rigid, flexible joint is resiliently formed.

20. Input device for a computer comprising a support element arranged for resting against a support pad, means for detecting the movement of the support element in relation to the support pad, communication means arranged for transmittal of information about the movement of the support element in relation to said support pad to a receiving unit, wherein said support element is formed with a protrusion comprising a torsionally rigid, flexible joint which is arranged to allow transfer of rotation around a first axis of rotation to a second axis of rotation arranged at an angle with said first axis of rotation and which is arranged to admit a change of said angle between said first and said second axis of rotation during detection of the movement of the support element in relation to the support pad, whereby said support element is designed to be controlled by a user via said torsionally rigid, flexible joint.

21. Grip arrangement for an input device for a computer comprising a support element arranged for resting against a support pad, means for detecting the movement of the support element in relation to the support pad and communication means arranged for transmittal of information about the movement of the support element in relation to said support pad to a receiving unit, wherein said grip arrangement comprises a torsionally rigid, flexible joint provided to be connected to said input device, whereby said support element is designed to be controlled by a user via said torsionally rigid, flexible joint which is arranged to allow transfer of rotation around a first axis of rotation to a second axis of rotation arranged at an angle with said first axis of rotation and which is arranged to admit a change of said angle between said first and said second axis of rotation during detection of the movement of the support element in relation to the support pad.

22. Input device according to claim 1, wherein the transmittal is wireless.

23. Grip arrangement according to claim 16, wherein the transmittal is wireless.

24. Input device according to claim 20, wherein the transmittal is wireless.

25. Grip arrangement according to claim 21, wherein the transmittal is wireless.

* * * * *